United States Patent

[11] 3,574,282

| [72] | Inventor | Kenneth R. Curwen |
| | | Shirley, Southampton, England |
| [21] | Appl. No. | 801,730 |
| [22] | Filed | Feb. 24, 1969 |
| [45] | Patented | Apr. 13, 1971 |
| [73] | Assignee | Kollsman Instrument Corporation |
| | | Syosset, N.Y. |

[54] ENGINE TEMPERATURE SPREAD DETECTOR
5 Claims, 5 Drawing Figs.

[52] U.S. Cl. ................................................ 73/116, 73/346
[51] Int. Cl. ........................................... G01m 15/00
[50] Field of Search ................................. 73/341, 346; 73/116

[56] References Cited
UNITED STATES PATENTS

| 3,138,957 | 6/1964 | Brunson | 73/341 |
| 3,454,785 | 7/1969 | Norman et al. | 307/221 |
| 3,461,380 | 8/1969 | Mc Ghee | 73/361X |
| 3,472,068 | 10/1969 | List et al. | 73/346X |

Primary Examiner—Jerry W. Myracle
Attorneys—E. Manning Giles, J. Patrick Cagney, Peter S. Lucyshyn and Richard G. Kinney ABSTRACT: A temperature spread detector for detecting a difference in temperature at various areas of a machine, such as a jet engine. The spread detector includes thermocouples for establishing signals representative of the temperature at various points, which signals are then converted to a sequential waveform by multiplexing means with such waveform being fed to minimum and maximum detectors which produce minimum and maximum values which, when accumulated in a summing amplifier, will produce a signal representative of temperature spread.

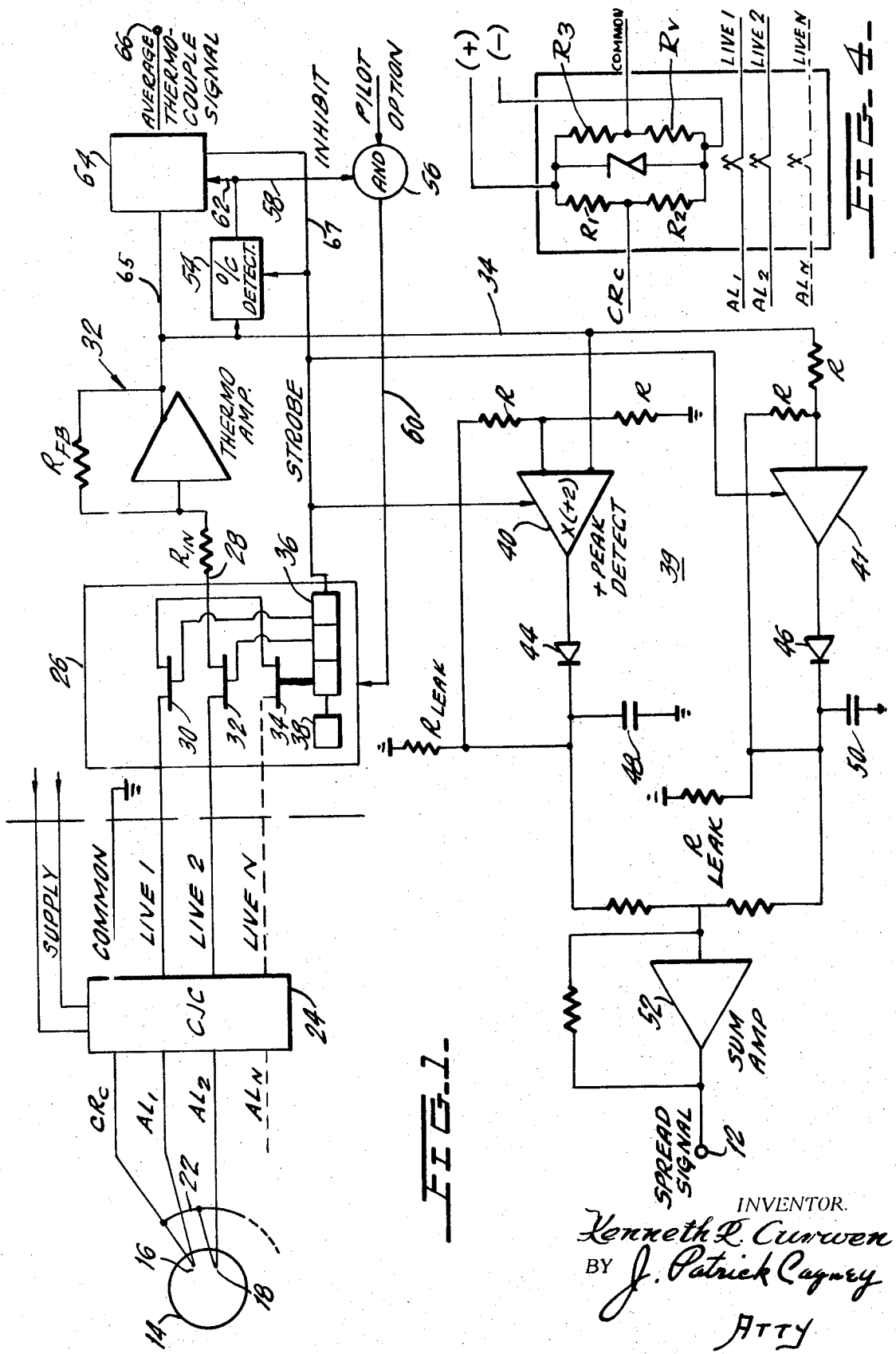

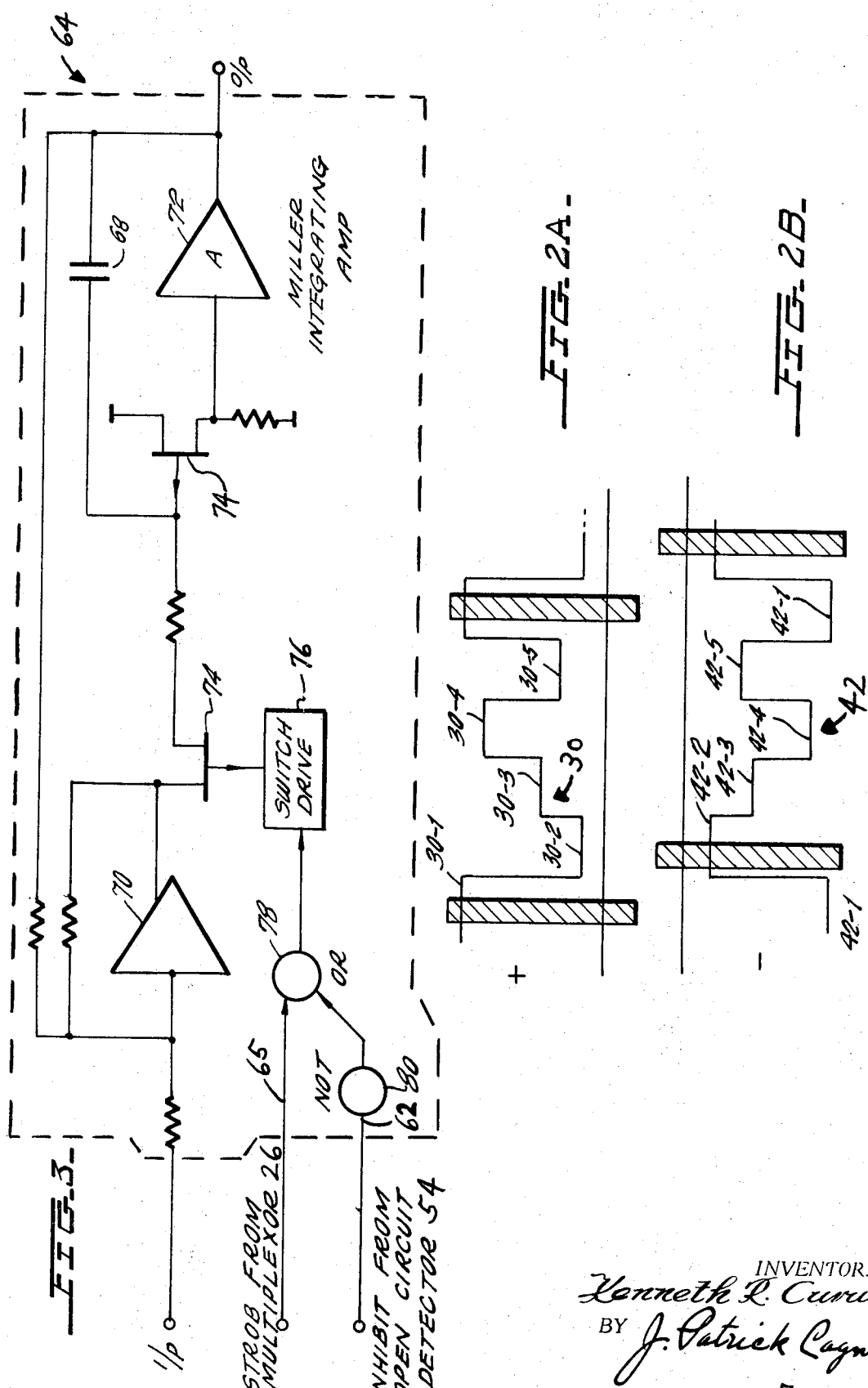

ENGINE TEMPERATURE SPREAD DETECTOR

This invention relates to temperature detection, and more particularly to a temperature spread detector capable of detecting the difference in temperatures at various portions of an engine.

It is well known that the useful life of an engine, such as a jet engine, is dependent to a great extent upon the temperature at which such engine is operated. Thus it is known that with a relatively small increase in operating temperature, engine life can depart substantially from its otherwise normal relationship wherein engine life is primarily dependent upon the number of hours of operation. Thus steps have been taken to produce engine life recorders which will continuously produce, as an output, a value representative of the consumed life of an engine wherein such consumed life will take into account not only the number of hours run, but the fluctuation in temperature during operation. Such an engine life recorder is described and claimed in U.S. Pat. application Ser. No. 719,660 filed Apr. 8, 1968, now U.S. Pat. No. 3,482,440, and assigned to the assignee of the present invention, and which disclosure is incorporated by reference herein.

Another useful parameter from which engine conditions can be ascertained is the temperature difference or spread between various portions of the engine which is being monitored. Since maximum temperature spreads are known for various engines, deviations from the expected temperature spread can act as an early warning of engine failure.

The instant invention provides such a temperature spread detector which is relatively simple and inexpensive, highly accurate, and eliminates many of the disadvantages inherent in prior art temperature detectors. Thus in its preferred embodiment, the instant invention includes a plurality of thermocouples which provide a plurality of signals representative of the temperature at various portions of the machine being monitored, such as a jet engine. The plurality of signals are then fed to a multiplexing system which converts said signals into a sequential waveform having amplitude variations corresponding to the amplitude fluctuations of the individual signals. The waveform is then fed to positive and negative peak detecting circuits which produce, as output signals, voltages representative of the maximum and minimum amplitudes in the waveform over a particular period. When these maximum and minimum signals are summed, the result is a signal representing the desired maximum temperature spread occurring within the engine being monitored.

In a preferred embodiment, the thermocouple system includes a plurality of thermocouples, such as Chromel-Alumel, all commoned together on one side. Each of the live wires together with the single common wire are led to a cold junction compensator, the output of which is a corresponding number of conductors of copper. The cold junction compensator adds correction voltages to compensate for the differences in conductors at the junctions, and in this manner permits the remainder of the temperature spread detector to be simply and easily manufactured using commonly available copper conductors. Additionally, the cold junction compensation can be performed adjacent to the engine to minimize the need for special cabling.

As another particularly advantageous feature of the instant invention, means are provided to detect the presence of a faulty thermocouple in the engine being monitored. Thus a fast thermocouple amplifier is provided to interpret an open circuit input as a high level signal, higher than the highest signal which is anticipated for the particular engine under consideration. Thus when a thermocouple has failed, bringing about an open circuit in the normally shorted thermocouple, the thermocouple amplifier will produce an output signal above the predetermined magnitude for the particular engine under consideration. With a detector, such as a threshold type of switching means set to turn on upon the reception of the aforesaid predetermined magnitude, a signal can thereby be provided to an inspector that a thermocouple is faulty and requires replacement.

In a preferred embodiment of the instant invention, the detection means for providing the maximum and minimum values comprises a pair of operational amplifiers which receive as inputs the sequential waveforms representative of the plurality of input signals developed by the thermocouples. The operational amplifiers are of opposite gain, and include storage means in the form of capacitors associated therewith, preferably in the feedback loops thereof, which will be appropriately charged to store an indication of both the maximum and minimum values occurring within any predetermined segment of the continuous waveforms being fed thereto.

As a particularly advantageous feature of the instant invention, the output of the aforementioned multiplexing means, that is, the sequential waveform, may be additionally fed to an averaging amplifier system which will produce as its output, an average temperature signal which can be used for various other purposes including the input to the engine life recorder of the aforementioned application Ser. No. 719,660. It will be appreciated that by using one set of thermocouples to develop both temperature spread and average temperature, economy is realized, while at the same time the faulty thermocouple detection system discussed above will be influential in the determination of both parameters.

Accordingly, it is an object of the instant invention to provide a temperature spread detector for detecting a difference in temperature at various portions of an engine being monitored.

Another object of the instant invention is to provide such a temperature spread detector which includes thermocouple means for generating signals representative of the temperature at various portions of an engine being monitored; multiplexing means for converting said signals into a sequential waveform; detection means for detecting a maximum and minimum value within said waveform; and summing means for combining said maximum and minimum values to establish an output signal representative of the difference between said maximum and minimum values.

Still another object of the instant invention is to provide such a temperature spread detector which includes cold junction compensator means for permitting conductors of various metals to be joined in operation.

Still another object of the instant invention is to provide such a temperature spread detector which includes means for detecting a faulty thermocouple.

Another object of the instant invention is to provide such a temperature spread detector which may optionally be provided with averaging means to provide an output signal representative of the average temperature of the engine being monitored.

Yet another object of the instant invention is to provide such a temperature spread detector which includes maximum and minimum detectors in the form of operational amplifiers having opposite gain, and storage means associated therewith for accumulating the maximum and minimum peak within a given waveform.

Other objects and a fuller understanding of the instant invention may be had by referring to the following description and drawings, in which:

FIG. 1 shows a circuit diagram of the temperature spread detector of the instant invention;

FIG. 2A and FIG. 2B illustrate typical waveforms which might be developed in the temperature spread detector of FIG. 1;

FIG. 3 illustrates an averaging system which may be optionally added to the spread detector of the instant invention to provide an average temperature signal as an output; and FIG. 4 shows a circuit diagram of the cold junction compensator.

Turning to FIG. 1, there is shown the temperature spread detector of the instant invention, primarily utilized to present an output signal at 12 which is representative of the maximum temperature spread existing between various portions of an engine, such as a jet engine 14 being monitored by a plurality of temperature responsive means such as thermocouples 16 and 18, the hot junctions of which are located at the various portions of the engine being monitored.

As illustrated in FIG. 1, preferably each of the thermocouples, which may be the common Chromel and Alumel thermocouples, for example, each include one live conductor, in this case illustrated as $AL_1$ and $AL_2$ (and $AL_n$ dependent upon the number of thermocouples being utilized) and are all commoned together by a conductor 22 to a common conductor, in this case a Chromel common $CR_c$. This arrangement of a common conductor materially reduces and simplifies the number of cables which have to be fed back from the engine to the temperature spread detector.

In order to eliminate the need for special cabling throughout the temperature spread detector of the instant invention, a cold junction compensator 24 is located relatively close to the engine 14. The input to this compensator 24 are the Alumel conductors $AL_1$, $AL_2$.... $AL_n$ and the common conductor Chromel $CR_c$. The output of such compensator is a similar number of conductors labeled COMMON and LIVE 1 to LIVE N and all are of common, inexpensive, available copper. The function of the cold junction compensator 24 is to insert a correction voltage to compensate for ambient temperature changes at the cold junction. In this case the inserted voltage is such as to reference the copper at 0° C. With respect to any Alumel-copper junction within the same ambient temperature environment. Thus all the Alumel-copper junctions are made within the same compensator 24, which is constructed to insure a common ambient temperature across all junctions.

The compensator circuit is shown to include a Zener diode $ZD_1$ connected across a pair of supply conductors. A voltage divider network R1, R2 has a juncture connected to the conductor $CR_c$ so that the voltage across R2 is injected in series with each of the thermocouple voltages. R2 is a copper resistor having a linear temperature coefficient. A balancing voltage divider network R3, RV is shown connected across the Zener diode and has the COMMON conductor leading from its midpoint.

As well understood in the art, the thermocouples 16 and 18 produce voltage signals representative of the temperature sensed at the various locations within the engine 14. These signals, after being compensated by the cold junction compensator 24, are then fed in parallel to a multiplexer arrangement 26, the function of which is to convert the plurality of parallel input signals into a sequential waveform appearing at the output 28 with such waveform having amplitude variations dependent upon the fluctuations and magnitude of the plurality of input signals.

In a preferred embodiment, the multiplexer 26 comprises a plurality of field-effect transistors, such as 30, 32 and 34, which are sequentially gated on under the control of a shifting register 36 which is driven by a multivibrator 38. Since the register 36 and multivibrator 38 individually form no part of the instant invention, and individually are well known in the art, a detailed description is unnecessary.

FIG. 2A illustrates a waveform at the output 28 of multiplexer 26 which would be formed when the input signals thereto were defined by 5 thermocouples in the engine 14 appropriately compensated by the cold junction compensator 24. It will be appreciated that the waveform 30 of FIG. 2A has amplitude variations within a given time period corresponding to the magnitude of the individual input signals 30-1, 30-2, 30-3, 30-4 and 30-5.

From the multiplexer 26, the output waveform 30 of FIG. 2A is passed through a fast thermocouple operational amplifier 32, the purpose of which will be further explained, along a conductor 34, to the detection circuitry broadly designated 39, the function of which is to generate maximum and minimum signals representative of the maximum and minimum temperatures existing within the waveform 30 of FIG. 2A. As illustrated in FIG. 1, the detecting circuitry includes a pair of operational amplifiers 40 and 41 operated by a strobe from multiplexer 26 and having positive and negative gains, respectively, so that the amplifier 41 will reverse the waveform 30 of FIG. 2A to produce the waveform 42 of FIG. 2B.

As previously stated, each of the amplifiers is provided with a diode 44 and 46, respectively, and a storage capacitor 48 and 50, respectively. As is clear from FIG. 1, since the associated diodes can only be driven one way, the capacitors will store the greatest peak detected by the respective amplifiers. Thus when the functions from the two amplifiers and associated capacitors 48 and 50 are summed in summing amplifier 52, a difference value signal 12, representative of the maximum spread between the input signals generated by the various thermocouples, is produced.

If a thermocouple should be faulty, the output of fast thermocouple amplifier (which is constructed to interpret an open circuit input from one of the thermocouples as a high level signal, higher than the highest thermocouple signal expected for the engine under consideration) would include a signal well beyond that which was expected for the particular engine under consideration. For example, if the output of amplifier 32 normally ranges from 0 to 6 volts for a temperature spread of 0° to 1,200° C., then any voltage above such magnitude should represent a faulty thermocouple.

To sense the presence of such high signal, an open circuit detector 54 is electrically connected into the output conductive line 34. The open circuit detector, may take any convenient form, but is essentially a threshold type of device which will be switched on in response to the occurrence of the predetermined high voltage signal indicative of faulty thermocouples. If desired, the output of the open circuit detector 54 may be utilized to energize a warning light or any other protective scheme and also, if desired, can be connected into an AND logic circuit 56 as by the conductor 58. The AND logic 56 can be energized at the option of the pilot whereby the open circuit channel of the multiplexer 28 can be inhibited through conductor 60 in the event that a faulty thermocouple is sensed. Additionally, if desired, by means of an output conductor 62, as will be described in greater detail, the detection of a faulty thermocouple may be utilized to deactivate an averaging amplifier 64 to be described below.

Turning to FIG. 3, the output from the multiplexer 26 can be additionally supplied as an input to an averaging amplifier 64 which will produce as an output signal at 66 a voltage representative of the average temperature of the engine 14 during a given period. Such signal can be used as an input signal for various devices among which would include the engine life recorder disclosed and claimed in the aforementioned application Ser. No. 719,660 filed Apr. 8, 1968.

The averaging amplifier 64 consists essentially of a conventional sample hold circuit in which the time constant of a storage capacitor 68 relative to a charging amplifier 70 is large enough that the circuit will average over several cycles of the waveforms presented by the multiplexer 26. The time constant of the capacitor 68 is made large by using a Miller integrating amplifier 72. The basic operation of such a sample and hold circuit is that when the switch defined by the field effect transistors 74 is closed, the charging amplifier 70 tends to bring the Miller amplifier 72 output to the same value as input at a speed dependent on the difference between the input and the Miller amplifier output. However, when the switch 74 is open, the Miller integrator output only changes to the degree that the capacitor and amplifier are imperfect. Of course, the charging amplifier 70 must have a regulated gain such that the maximum expected thermocouple spread does not saturate the amplifier.

As suggested in FIG. 3, the switch 74 is operated by a switch drive 76 driven through an OR circuit 78 by a strobe from the multiplexer 26. In this manner the switch closure at 74 is arranged to occur in the middle of each amplitude variation in the waveform produced at the output 28 of the multiplexer and thereby assures that transient conditions in the multiplexer and thermocouple have ceased. Furthermore, as suggested previously, the open circuit detector 54 can be used to inhibit the switch drive 76 by means of a NOT circuit 80 to prevent the loading of a very high (faulty thermocouple) signal into the temperature averaging system.

Thus there has been described a relatively simple and inexpensive temperature spread detector capable of producing a spread signal at its output representative of the maximum temperature spread existing between various areas of an engine under consideration. By utilizing a cold junction compensator, a multiplexing arrangement, and simple maximum and minimum detectors, a highly accurate detector is provided. Furthermore, such detector lends itself to the addition of such modules as an averaging amplifier and an open circuit detector which can detect the presence of a faulty thermocouple commonly used to produce the voltage signals from the engine.

Although there has been described a preferred embodiment of this novel invention, many variations and modifications will now be apparent to those skilled in the art. Therefore, this invention is to be limited not by the specific disclosure herein but only by the appending claims.

I claim:

1. The combination in a temperature detector of a plurality of thermocouples for producing individual signals each representing the temperature at a different point in a various temperature zone, each of said thermocouples having an individual live conductor of a first material and sharing a common conductor of a second material, comparison means responsive to said individual signals for providing an output signal corresponding to the difference between the maximum and minimum of the individual signals so that said output signal represents the temperature spread, and cold junction compensation means interposed between said thermocouples and said comparison means for inserting correction voltages into said individual signals, the magnitude of said correction voltages being dependent upon the ambient temperature conditions at said cold junction compensation means and the nature of the conductors of said thermocouples relative to the nature of the conductors utilized as input conductors to said comparison means, each said live conductor and said common conductor being the input to said cold junction compensation means, said cold junction compensation means having an equal number of output conductors as the total number of input conductors, said output conductors being of a third material.

2. The combination in a temperature detector of a plurality of temperature responsive detection means for producing individual signals each representing the temperature at a different point in a various temperature zone, and comparison means responsive to said individual signals for providing an output signal corresponding to the difference between the maximum and minimum of the individual signals so that said output signal represents the temperature spread, said comparison means including sequencing means responsive to said individual signals for producing a sequential waveform comprised of said individual signals and detection means responsive to said waveform for generating maximum and minimum values representative of the maximum and minimum of said individual signals, said detection means including a pair of operational amplifiers each including a feedback loop.

3. The combination of claim 2, wherein said pair of operational amplifiers have opposite gains.

4. The combination of claim 3, wherein each of said feedback loops include storage means for accumulating said maximum and minimum values which may exist in said waveforms.

5. The combination of claim 4, wherein said storage means comprise capacitors.